(12) United States Patent
Savagner et al.

(10) Patent No.: US 8,196,718 B2
(45) Date of Patent: *Jun. 12, 2012

(54) COMBINED SERVICE BRAKE AND STORED-ENERGY BRAKE CYLINDER WITH INTERNAL VENTILATION

(75) Inventors: Nicolas Savagner, Le Mesnil Eudes (FR); Antony Schodrowski, Lisieux (FR)

(73) Assignee: KNORR-BREMSE Systeme fuer Nutzfahzeuge GmbH, Munich (DE)

( * ) Notice: Subject to any disclaimer, the term of this patent is extended or adjusted under 35 U.S.C. 154(b) by 868 days.

This patent is subject to a terminal disclaimer.

(21) Appl. No.: 12/095,816

(22) PCT Filed: Dec. 1, 2006

(86) PCT No.: PCT/EP2006/011576
§ 371 (c)(1),
(2), (4) Date: Nov. 26, 2008

(87) PCT Pub. No.: WO2007/062869
PCT Pub. Date: Jun. 7, 2007

(65) Prior Publication Data
US 2009/0134697 A1 May 28, 2009

(30) Foreign Application Priority Data
Dec. 2, 2005 (DE) .............. 20 2005 018 886 U

(51) Int. Cl.
*F16D 65/24* (2006.01)
*B60T 11/10* (2006.01)

(52) U.S. Cl. ............ 188/170; 188/153 D; 92/48; 92/62; 92/63; 92/82

(58) Field of Classification Search ............. 188/153 D, 188/170; 92/48, 62, 63, 82
See application file for complete search history.

(56) References Cited

U.S. PATENT DOCUMENTS

| 3,736,842 | A | * | 6/1973 | Valentine | 91/1 |
| 3,799,299 | A | * | 3/1974 | Cohen | 188/282.5 |
| 4,364,305 | A | * | 12/1982 | Dalibout et al. | 92/63 |
| 5,713,238 | A | * | 2/1998 | Pierce et al. | 73/161 |
| 6,907,818 | B2 | * | 6/2005 | Anderson | 92/62 |

FOREIGN PATENT DOCUMENTS

| DE | 2923359 A | * 12/1980 |
| DE | 40 11 739 A1 | 10/1991 |
| DE | 197 34 291 C1 | 12/1998 |
| DE | 102 36 923 A1 | 5/2003 |
| EP | 0 554 050 A1 | 8/1993 |
| FR | 2 545 175 A1 | 11/1984 |

OTHER PUBLICATIONS

Form PCT/ISA/237 w/English translation (twelve (12) pages).
International Search Report with English translation dated Mar. 12, 2007 (Six (6) pages).

* cited by examiner

*Primary Examiner* — Bradley King
*Assistant Examiner* — Mahbubur Rashid
(74) *Attorney, Agent, or Firm* — Crowell & Moring LLP

(57) ABSTRACT

A combined service brake and the stored-energy brake cylinder is provided, in which a ventilation valve which forms or shuts off a flow connection between the spring chamber and the service brake chamber of the brake cylinder ensures that disruptive noise is avoided while also preventing loss of air volume for building up the service brake force.

7 Claims, 4 Drawing Sheets

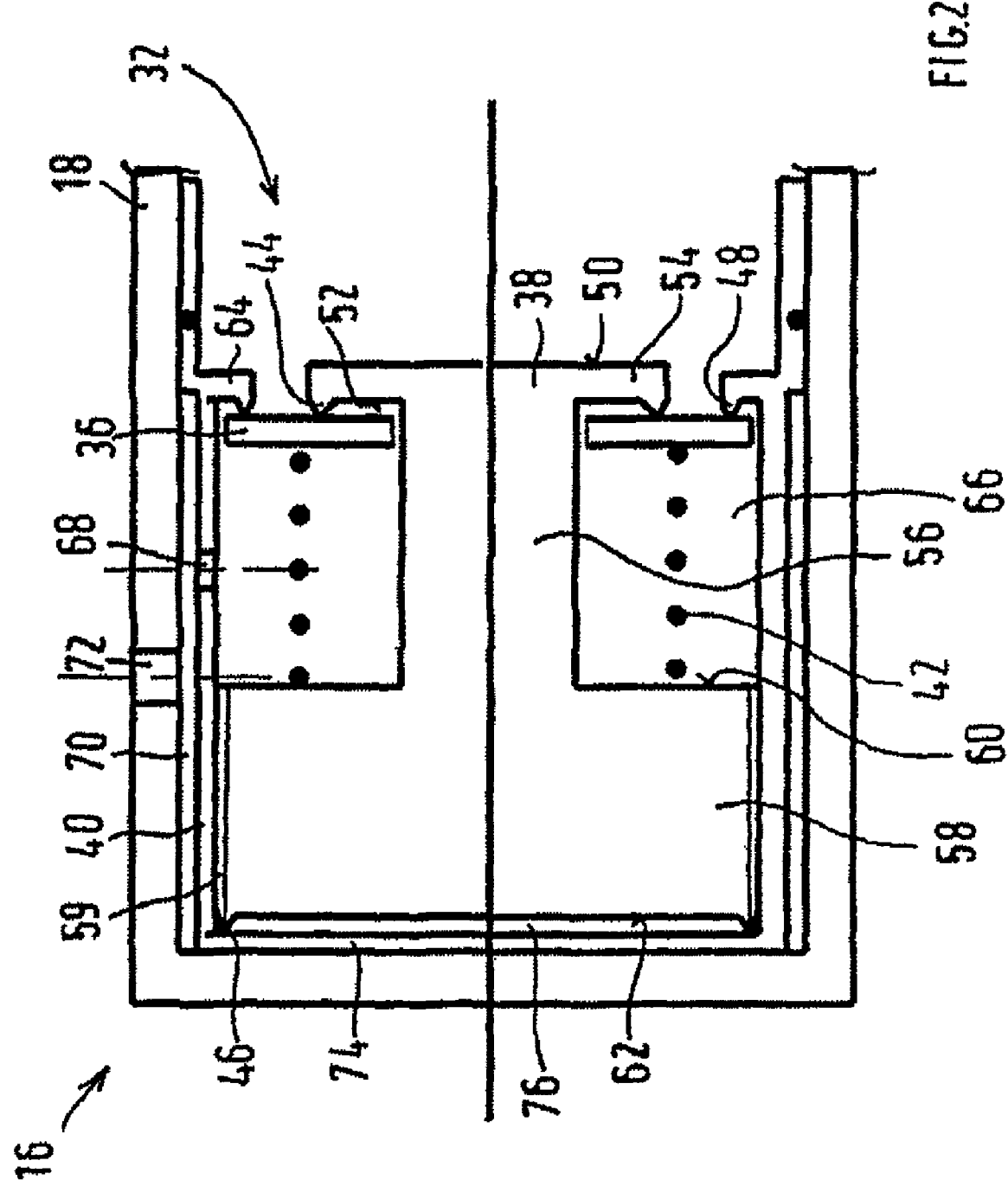

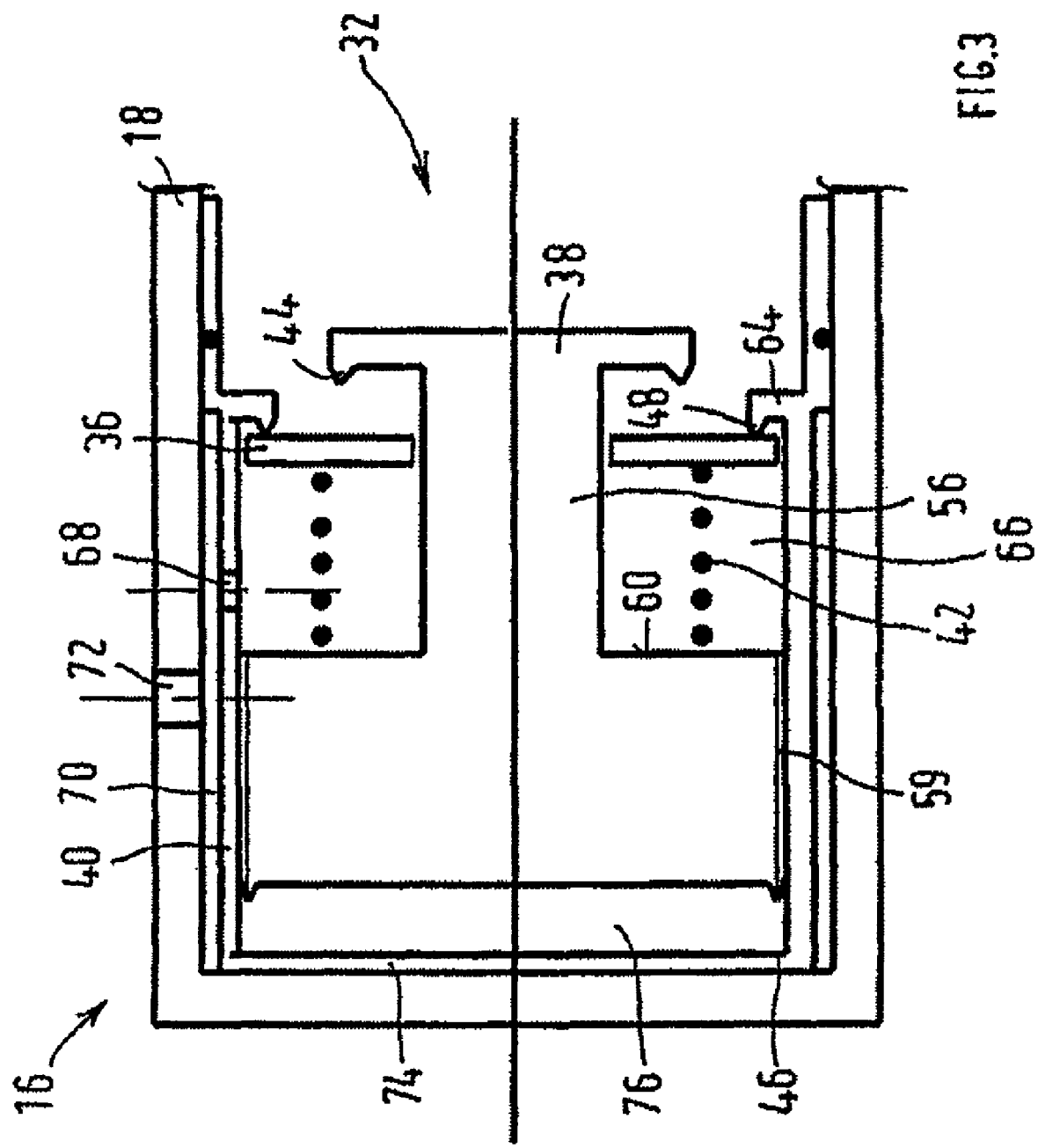

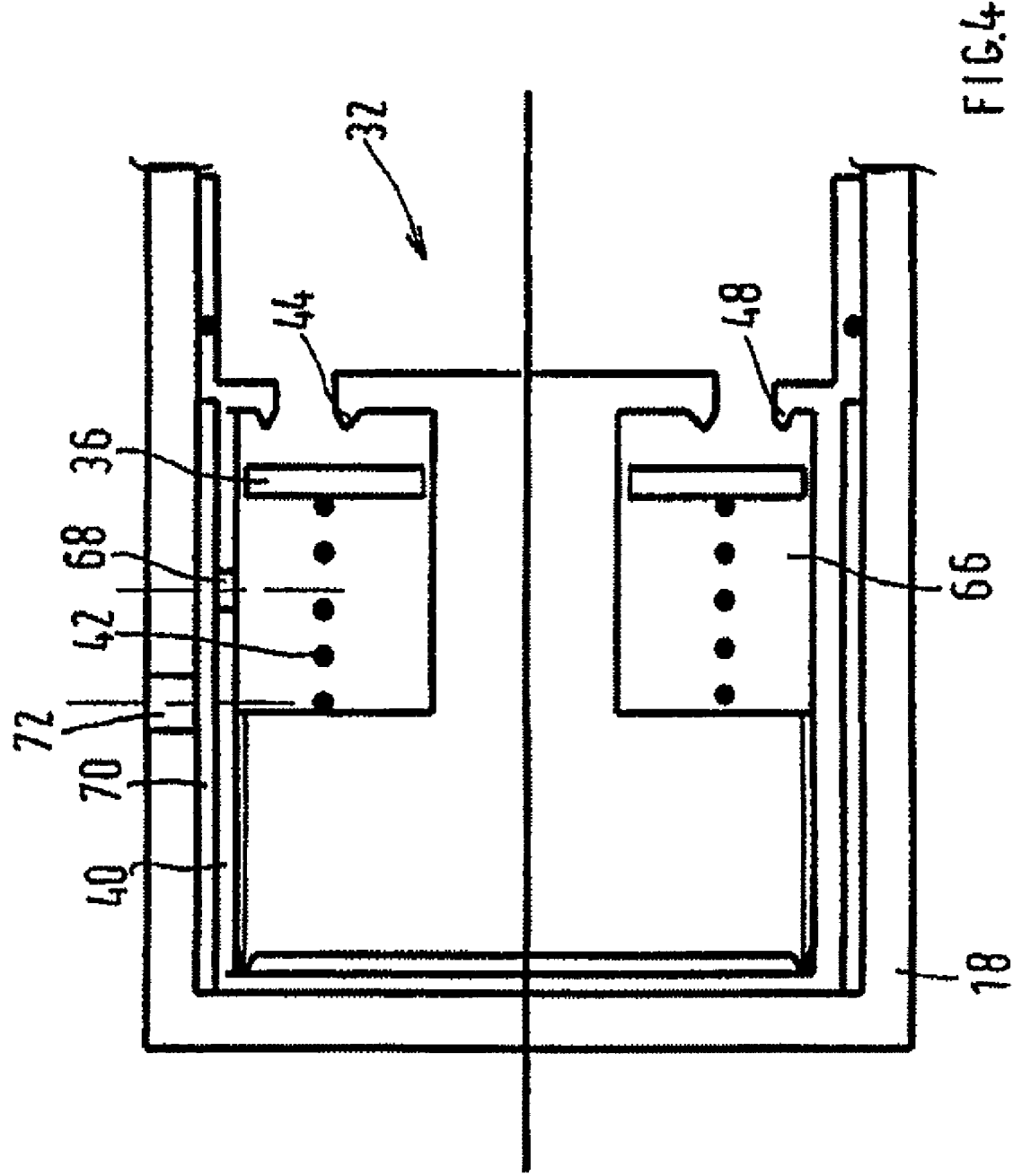

COMBINED SERVICE BRAKE AND STORED-ENERGY BRAKE CYLINDER WITH INTERNAL VENTILATION

CROSS-REFERENCE TO RELATED APPLICATIONS

This application is a U.S. National Phase of PCT International Application No. PCT/EP2006/011576, filed on Dec. 1, 2006, which claims priority under 35 U.S.C. §119 to German Application No. 20 2005 018 886.7, filed Dec. 2, 2005, the entire disclosures of which are expressly incorporated by reference herein.

BACKGROUND AND SUMMARY OF THE INVENTION

The invention proceeds from a combined service brake and stored-energy brake cylinder having a diaphragm which is arranged in a housing of the service brake cylinder, can be loaded with pressure and delimits a service brake chamber which can be loaded with a service brake pressure on one side and a chamber which accommodates restoring springs on the other side, a stored-energy brake piston which is arranged in a housing of the stored-energy brake cylinder, can be actuated by a storage spring, delimits a stored-energy brake chamber on one side and a spring chamber which accommodates a storage spring on the other side, and has a piston rod which carries a venting valve which produces or shuts off a flow connection between the spring chamber and the service brake chamber, according to the preamble of claim 1.

A combined service brake and stored-energy brake cylinder of this type is known, for example, from DE 40 11 739 A1. There, the venting valve is arranged on the end side in the hollow piston tube of the stored-energy brake piston which can project into the service brake chamber depending on the operating state. The venting valve has the object of dissipating the excess pressure which is produced in the spring chamber by the retraction of the service brake piston and the resultant reducing volume of said spring chamber when the parking brake is released, by said venting valve being switched into the open position by said excess pressure and producing a flow connection between the spring chamber and the service brake chamber. When driving off on a flat driving path, the service brake chamber is ventilated and is associated with ventilation of a pressure control module, since a service brake operation is not necessary after release of the parking brake. Then, at least a part of the excess air volume in the spring chamber can flow out, which as a consequence does not pass directly from there into the atmosphere, but rather via the aerating and venting path of the service brake chamber. In this context, internal ventilation is therefore also spoken of.

When driving off on an uphill driving path, it is necessary, however, when the parking brake is firstly applied to additionally apply the service brake at least briefly before the parking brake is released, in order to prevent the vehicle from rolling backward when driving off. In this case, the service brake chamber is ventilated. If the driver demands sufficiently high braking, the service brake pressure which prevails in the service brake chamber and at the same time on one side of the piston is capable of holding said piston on the valve seat counter to the action of the pressure is built up in the spring chamber and, as a result, of holding the venting valve closed. If, however, the service brake pressure and/or the service brake pressure gradient are/is below certain threshold values on account of a correspondingly low service brake demand of the driver, the service brake pressure which prevails on one side of the piston is not sufficient to hold the venting valve closed. Compressed air then flows from the service brake chamber via the open venting valve into the spring chamber. From there, it escapes via the piston seal and the housing seal into the atmosphere, which firstly causes disruptive noise; secondly, the air volume which flows out via the venting valve is no longer available for building up the service brake force.

The present invention is based on the object of developing a combined service brake and stored-energy brake cylinder of the type mentioned in the introduction in such a way that the abovementioned disadvantages are avoided.

According to the invention, this object is achieved by the features of claim 1.

The venting valve of the combined service brake and stored-energy cylinder according to the invention has the following characterizing features:

a) a piston is provided which carries a valve body and is guided axially displaceably in a cylinder which is formed on the piston rod,
b) at least one compression spring which is supported on the piston loads the valve body against a first valve seat on the piston and against a second valve seat on the cylinder,
c) the valve body is loaded by the pressure in the spring chamber in a direction which lifts it up from the first valve seat and from the second valve seat,
d) the piston is loaded by the pressure in the service brake chamber in a direction which presses the first valve seat against the valve body and lifts the valve body up from the second valve seat,
e) a flow connection being produced between the service brake chamber and the spring chamber when the valve body is lifted up from the first valve seat and/or from the second valve seat.

These measures ensure that the venting valve remains closed if, when the parking brake is applied, the service brake is applied at the same time. No more compressed air can therefore cross from the service brake chamber via the venting valve into the spring chamber and escape from there into the atmosphere, as a result of which disruptive noise is prevented.

Advantageous developments and improvements of the invention which is specified in the independent claims are possible as a result of the measures which are cited in the subclaims.

More precise details are apparent from the following description of exemplary embodiments.

BRIEF DESCRIPTION OF THE DRAWINGS

In the following text, an exemplary embodiment of the invention is shown in the drawing and explained in greater detail in the following description. In the drawing:

FIG. 2 shows the venting valve from FIG. 1 in the closed position;

FIG. 3 shows the venting valve from FIG. 1 in an open position during the application of the parking brake; and FIG. 4 shows the venting valve from FIG. 1 in an open position during the release of the parking brake.

DETAILED DESCRIPTION

Figure 1:
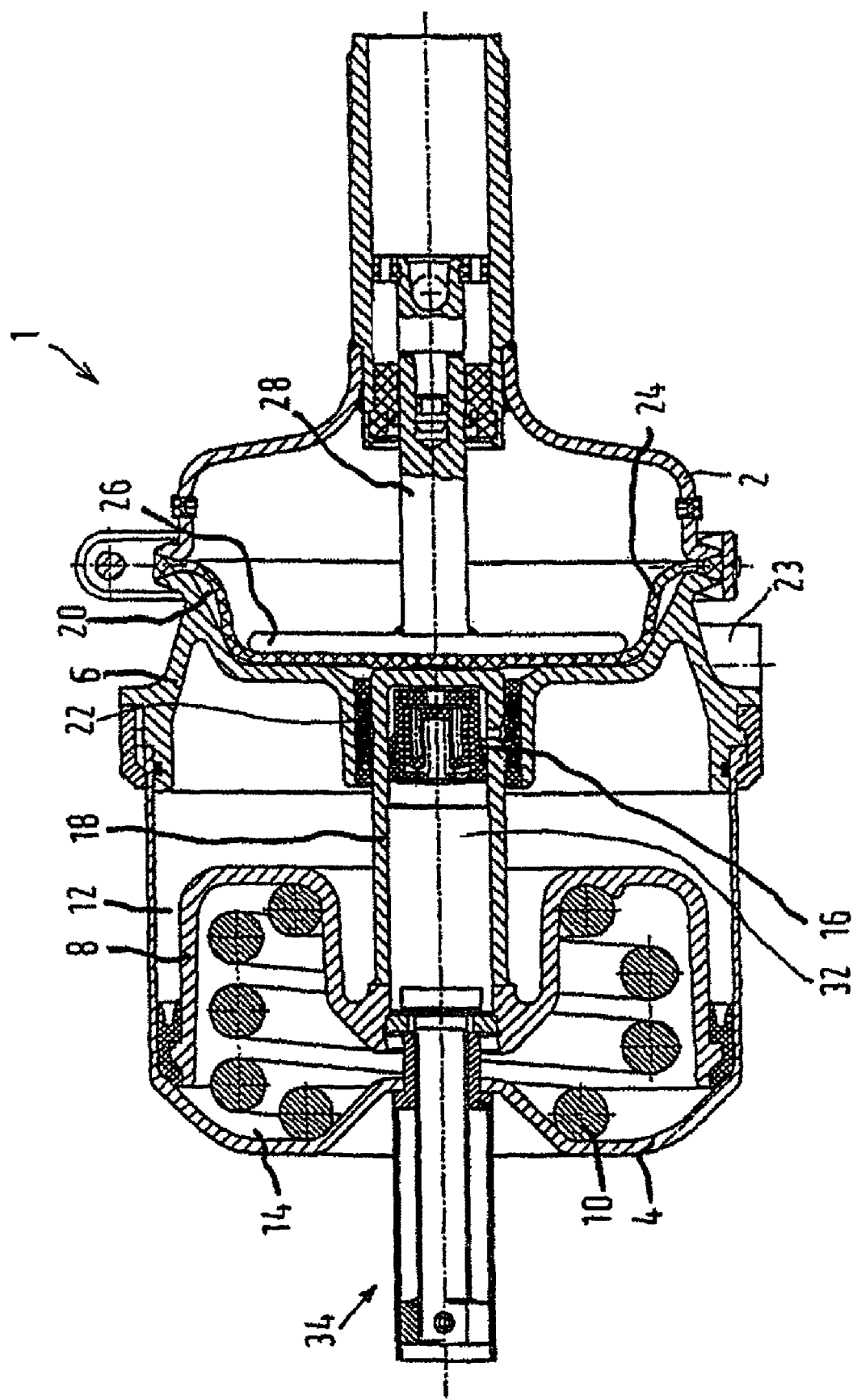
FIG. 1 shows a sectional illustration of a combined service brake and stored-energy brake cylinder according to a preferred exemplary embodiment of the invention, with a venting valve.

For the exemplary explanation of the invention, FIG. 1 shows a combined service brake and stored-energy brake cylinder 1, called a combined cylinder in the following case. The combined cylinder comprises a service brake cylinder 2 and a stored-energy brake cylinder 4 which is connected structurally and functionally to the former. The service brake cylinder 2 and the stored-energy brake cylinder 4 are divided from one another by an intermediate wall 6. A stored-energy brake piston 8 is arranged displaceably within the stored-energy brake cylinder 4, a storage spring 10 bearing against one side of the stored-energy brake piston 8. On its opposite side, the storage spring 10 is supported on the base of the stored-energy brake cylinder 4.

A stored-energy brake chamber 12 is formed between the stored-energy brake piston 8 and the intermediate wall 6, which stored-energy brake chamber 12 is connected to a pressure control module which is not shown for scale reasons, in order to aerate and ventilate the latter. In the case of aeration, the stored-energy brake piston 8 is pushed axially into the release position of the parking brake under stress of the storage spring 10. During this displacement of the stored-energy brake piston 8, the air which is present within the spring chamber 14 which accommodates the storage spring 10 is pressed out via a venting valve 16. If, in contrast, the stored-energy brake chamber 12 is ventilated for the purpose of braking, the storage spring 10 is capable of displacing the stored-energy brake piston 8 into the application position.

The stored-energy brake piston 8 is connected to a hollow piston rod 18 which extends through the intermediate wall 6 into a service brake chamber 20 of the service brake cylinder 2. A seal 22 which is inserted in the intermediate wall 6 seals with respect to the outer wall of the piston rod 18 during its longitudinal movement. An inlet 23, via which compressed air is let in and discharged in order to actuate the service brake cylinder 2, opens into the service brake chamber 20. The compressed air acts on a diaphragm 24 which is inserted within the service brake cylinder 2 and on the opposite side of which a pressure piece is provided in the form of a diaphragm plate 26. The diaphragm plate 26 is connected to a push rod 28 which interacts with a brake actuating mechanism outside the combined cylinder 1. This can be, for example, actuating elements of a disk brake of a motor vehicle. The service brake cylinder 2 is an active brake cylinder, that is to say the service brake is applied by aerating the service brake chamber 20 and is released by ventilation. A restoring spring (not shown) which is supported on one side on the diaphragm plate 26 and on the other side on the base of the service brake cylinder 2 ensures that the push rod 28 is restored into the release position in the case of a ventilated service brake chamber 20.

The venting valve 16 is arranged in that end of the piston rod 18 which points away from the stored-energy brake piston 8, and is accommodated in its interior space 32, to be more precise. Although, furthermore, an emergency release device 34 of no further interest here is arranged there, the interior space 32 of the piston rod 18 can communicate with the spring chamber 14.

According to FIG. 2, the venting valve 16 of the combined service brake and stored-energy cylinder has the following features:

a) a piston 38 is provided which carries a valve body 36 and is guided axially displaceably in a cylinder 40 which is formed on the piston rod 18,
b) at least one compression spring 42 which is supported on the piston 38 loads the valve body 36 against a first valve seat 44 on the piston 38 and against a second valve seat 48 on the cylinder 40,
c) the valve body 36 is loaded by the pressure in the spring chamber 14 in a direction which lifts it up from the first valve seat 44 and from the second valve seat 48,
d) the piston 38 is loaded by the pressure in the service brake chamber 20 in a direction which presses the first valve seat 44 against the valve body 36 and lifts the valve body 36 up from the second valve seat 48,
e) a third valve seat 46 is formed between the piston 38 and a base 74 of the cylinder 40,
f) at least one position of the piston 38 existing, in which the first valve seat 44 is lifted up from the valve body 36, the valve body 36 seals against the second valve seat 48, the piston 38 is lifted up from the third valve seat 46 and is then loaded by the pressure in the service brake chamber 20 in a direction which lifts the first valve seat 44 up from the valve body 36, and,
g) when the valve body 36 is lifted up from the first valve seat 44 and/or from the second valve seat 48, a flow connection is produced between the service brake chamber 20 and the spring chamber 14.

As is apparent from FIG. 2 to FIG. 4, the piston 38 essentially has three sections; a first piston section which faces the spring chamber 14 and has a first piston plate 54, on which a first piston face 50 and a second piston face 52 are formed; a second piston section which adjoins said first piston section and is configured as a piston rod 56; and a third piston section which is configured as a second piston plate 58 and on which a third piston face 60 and a fourth piston face 62 are formed. The cylinder 40 is held in a rotationally and axially fixed manner in the interior space 32 of the piston rod 18. The piston 40 is guided axially in the cylinder 40 substantially by the second piston plate 58, there being no tight guidance, however, but rather a narrow annular channel 59 being formed between the radially outer circumferential face of the second piston plate 58 and the radially inner circumferential face of the cylinder 40, through which annular channel 59 compressed air can flow.

A first chamber 66 is formed between the third piston face 60, the radially inner circumferential face of the cylinder 40 and a further base 64 of the cylinder 40, the base 64 of the cylinder 40 having a central through opening, through which the first piston plate 54 can extend. On its face which points toward the first chamber 66, the second valve seat 48 is formed on the base 64 of the cylinder 40. The first valve seat 44 is situated on the second piston face 52 of the piston 38, which second piston face 52 points toward the first chamber 66. Furthermore, the compression spring 42 is accommodated in the first chamber 66, which compression spring 42 is supported on one side on the valve body 36 and on the other side on the third piston face 60 on the second piston plate 58. The compression spring 42 is installed in a prestressed state.

The valve body 36 is preferably configured as a ring which surrounds the piston rod 56 and the outer diameter of which is smaller than the inner diameter of the cylinder 40, with the result that there is an inside annular gap between the ring 36 and the cylinder 40. The ring 36 therefore seals against the first valve seat 44 on the first piston plate 54 or against the second valve seat 48 on the base 64 of the cylinder 40 only in the axial direction.

The first chamber 66 is constantly (that is to say, in every axial position of the piston 38) flow connected to an annular chamber 70 by means of at least one radial through hole 68 in the cylinder 40. Said annular chamber 70 surrounds the cylinder 40 and is in turn connected to the service brake chamber 20 via at least one radial through hole 72 in the piston rod 18. Furthermore, a third chamber 76 is formed between the second piston plate 58 and the base 74 of the cylinder 40.

FIG. 2 shows the venting valve 16 in the closed position, that is to say the ring 36 bears in an axially sealing manner against the first valve seat 44 and against the second valve seat 48 and, as a consequence, there is no flow connection between the interior space 32 of the piston rod 18, which interior space 32 is under the pressure of the spring chamber 14, and the annular chamber 70 which is connected to the service brake chamber 20. Furthermore, the piston 38 seals against the third valve seat 46 in this position, with the result that there is no flow connection between the third chamber 76 and the first chamber 66.

Proceeding from this state, in which neither the service brake nor the parking brake is actuated, the parking brake is then applied while the service brake is still released. The spring chamber 14 is enlarged suddenly by the stored-energy brake piston 12 which is displaced by the storage spring 10, as a result of which the pressure in said spring chamber 14 drops to a pronounced extent, for example below atmospheric pressure. The relatively low pressure of the spring chamber 14 therefore acts on the first piston face 50; the second piston face 52 and the third piston face 60 are loaded by the pressure of the service brake chamber 20, which pressure corresponds approximately to atmospheric pressure.

As a result of the pressure difference, the piston 38 in FIG. 3 is displaced to the right counter to the action of the shortening first compression spring 42, as a result of which the first valve seat 44 lifts up from the ring 36 and a flow cross section is opened, as a result of which air can flow out of the service brake chamber 20 via the through hole 72 in the piston rod 18 into the annular chamber 70, from there via the radial through hole 68 in the cylinder 40 into the first chamber 66 and finally from there into the interior space 32 of the piston rod 18, which interior space 32 is in turn connected to the spring chamber 14 such that pressure is conducted. Pressure equalization can therefore take place between the spring chamber 14 and the service brake chamber 20. In contrast, the ring 36 remains pressed sealingly against the second valve seat 48 on the base 64 of the cylinder 40 as a result of the action of the compression spring 42.

As a result of the displacement of the piston 38 to the right in FIG. 3, it lifts up from the third valve seat 46, as a result of which a flow connection is produced between the annular channel 59, which is under the pressure of the service brake chamber, and the third chamber 76 which is gradually loaded as a consequence with this pressure which corresponds approximately to atmospheric pressure. This results in a further pressure force on the piston 38 which acts to the right in the figure, which piston 38 is loaded as a result in a direction which lifts the first valve seat 44 up from the valve body 36.

The gradually increasing pressure in the spring chamber 14 also loads the third piston face 60, with the result that the piston 38 is displaced to the left in FIG. 3 as a consequence of the pressure force which results there, until the first valve seat 44 again comes into sealing contact with the ring 36. At the same time, the piston 38 also comes into contact again with the valve seat 46 on the base 74 of the cylinder 40. This movement is assisted by the spring force of the first compression spring 42 until the venting valve 16 is situated again in the position which is shown in FIG. 2.

When the parking brake is released, the pressure rises in the spring chamber 14 as a consequence of its reduction in size. As can be understood readily using FIG. 4, this increased pressure acts on the ring 36, as a result of which the latter moves to the left counter to the action of the shortening compression spring 42. The ring 36 therefore lifts up both from the first valve seat 44 and from the second valve seat 48. Since the ring 36 seals radially neither against the cylinder 40 nor against the piston rod 56, but rather an annular gap is always left free, compressed air can then flow from the spring chamber 14 via the interior space 32 of the piston rod 18, the first chamber 66, the through hole 68 in the cylinder 40, the annular chamber 70 and the through hole 72 in the piston rod 18 into the service brake chamber 20 which is loaded with a lower pressure in comparison. After pressure equalization has been carried out between the spring chamber 14 and the service brake chamber 20, the ring 36 is moved to the right into the closed position as a consequence of the action of the compression spring 42, in which closed position said ring 36 bears axially sealingly again against the first valve seat 44 and against the second valve seat 48.

FIG. 2 also identifies a closed position of the venting valve 16, which position is set when the service brake is actuated additionally during application of the parking brake. A situation of this type results, for example, during driving off uphill. When the parking brake is applied, the pressure in the spring chamber 14 drops, as already explained with respect to FIG. 3, which leads to the piston 38 moving to the right. After pressure equalization has been carried out between the spring chamber 14 and the service brake chamber 20, that is to say at a pressure in the spring chamber 14 which is increased by the inflow of air from the service brake chamber 20, said increased pressure and the compression spring 42 reinstate the closed position. If, proceeding from this state, the service brake is then additionally actuated, the pressure rises in the service brake chamber 20. This increased service brake pressure then also prevails in the first chamber 66 because compressed air can pass there via the through hole 72 in the piston rod 18, the annular chamber 70 and the through hole 68 in the cylinder 40. This service brake pressure also acts on the ring 36, as a result of which the latter increases its sealing action against the first valve seat 44 and the second valve seat 48 and assists the action of the first compression spring 42 which holds the ring 36 there.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF DESIGNATIONS

1 Service brake and spring accumulator
2 Service brake cylinder
4 Stored-energy brake cylinder
6 Intermediate wall
8 Stored-energy brake piston
10 Storage spring
12 Stored-energy brake chamber
14 Spring chamber
16 Venting valve
18 Piston rod
20 Service brake chamber
22 Seal
23 Inlet
24 Diaphragm
26 Diaphragm plate
28 Push rod
32 Interior space
34 Emergency release device
36 Valve body
38 Piston
40 Cylinder
42 Compression spring
44 First valve seat
46 Third valve seat 48 Second valve seat
50 First piston face
52 Second piston face
54 First piston plate
56 Piston rod
58 Second piston plate
59 Annular channel
60 Third piston face
62 Fourth piston face
64 Base
66 First chamber
68 Through hole
70 Annular chamber
72 Through hole
74 Base
76 Third chamber

What is claimed is:

1. A combined service brake and stored-energy brake cylinder, comprising:
 a service brake cylinder;
 a stored-energy brake cylinder structurally connected to the service brake cylinder;
 a diaphragm, the diaphragm being arranged in the service brake cylinder and delimiting on a first side of the diaphragm a service brake chamber which can be loaded with a service brake pressure and delimiting on a second side of the diaphragm a chamber which accommodates restoring springs; and
 a stored-energy brake piston, the stored-energy brake piston being arranged in the stored-energy brake cylinder and delimiting on a first side of the stored-energy brake piston a stored-energy brake chamber and delimiting on a second side of the stored-energy brake piston a spring chamber which accommodates a storage spring, the stored-energy brake piston further including a piston rod which carries a venting valve which produces or shuts off a flow connection between the spring chamber and the service brake chamber,
 wherein the venting valve includes a piston which carries a valve body and at least one compression spring supported on the piston, and
   the venting valve piston is guided axially displaceably in a cylinder formed on the piston rod,
   the at least one compression spring supported on the venting valve piston biases the valve body against a first valve seat on the venting valve piston and against a second valve seat on the cylinder,
   the valve body is loaded by pressure in the spring chamber in a direction which lifts the valve body off of the first valve seat and off of the second valve seat,
   the venting valve piston is loaded by pressure in the service brake chamber in a direction which presses the first valve seat against the valve body and lifts the valve body off of the second valve seat, and
   a flow connection exists between the service brake chamber and the spring chamber when the valve body is lifted off of at least one of the first valve seat and the second valve seat.

2. The service brake and stored-energy brake cylinder as claimed in claim 1, wherein
 a third valve seat is formed between the venting valve piston and a base of the cylinder,
 in at least one position of the venting valve piston, the first valve seat is lifted off of the valve body, the valve body seals against the second valve seat, the venting valve piston is lifted off of the third valve seat, and the venting valve piston is loaded by pressure in the service brake chamber in a direction which lifts the first valve seat off of the valve body.

3. The service brake and stored-energy brake cylinder as claimed in claim 2, wherein
 the venting valve piston is guided with play in the cylinder, and an annular channel exists between the venting valve piston and the cylinder which is exposed to pressure from the service brake chamber.

4. The service brake and stored-energy brake cylinder as claimed in claim 3, wherein
 when the venting valve piston is lifted off of the third valve seat, the annular chamber is in a flow connection with a chamber delimited by the venting valve piston and the base of the cylinder.

5. The service brake and stored-energy brake cylinder as claimed in claim 1, wherein
 the valve body is formed by an axially sealing ring on which the compression spring is supported.

6. The service brake and stored-energy brake cylinder as claimed in claim 1, wherein
 the cylinder is formed within the piston rod at an end away from the spring chamber.

7. A service brake, comprising:
 a brake assembly containing a brake application mechanism; and
 a combined service brake and stored-energy brake cylinder operably connected to the brake assembly to actuate the brake application mechanism, the combined service brake and stored-energy brake cylinder having
   a service brake cylinder,
   a stored-energy brake cylinder structurally connected to the service brake cylinder,
   a diaphragm, the diaphragm being arranged in the service brake cylinder and delimiting on a first side of the diaphragm a service brake chamber which can be loaded with a service brake pressure and delimiting on a second side of the diaphragm a chamber which accommodates restoring springs, and
   a stored-energy brake piston, the stored-energy brake piston being arranged in the stored-energy brake cylinder and delimiting on a first side of the stored-energy brake piston a stored-energy brake chamber and delimiting on a second side of the stored-energy brake piston a spring chamber which accommodates a storage spring, the stored-energy brake piston further including a piston rod which carries a venting valve which produces or shuts off a flow connection between the spring chamber and the service brake chamber,
 wherein the venting valve includes a piston which carries a valve body and at least one compression spring supported on the piston, and
   the venting valve piston is guided axially displaceably in a cylinder formed on the piston rod,
   the at least one compression spring supported on the venting valve piston biases the valve body against a first valve seat on the venting valve piston and against a second valve seat on the cylinder,
   the valve body is loaded by pressure in the spring chamber in a direction which lifts the valve body off of the first valve seat and off of the second valve seat,
   the venting valve piston is loaded by pressure in the service brake chamber in a direction which presses the first valve seat against the valve body and lifts the valve body off of the second valve seat, and
 a flow connection exists between the service brake chamber and the spring chamber when the valve body is lifted off of at least one of the first valve seat and the second valve seat.

* * * * *